(12) United States Patent
Li et al.

(10) Patent No.: US 7,772,151 B2
(45) Date of Patent: Aug. 10, 2010

(54) ZONE CATALYZED SOOT FILTER

(75) Inventors: Cheng G. Li, Troy, MI (US); Fuhe Mao, Rochester, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/560,062

(22) Filed: Sep. 15, 2009

(65) Prior Publication Data

US 2010/0003172 A1   Jan. 7, 2010

Related U.S. Application Data

(63) Continuation of application No. 11/880,381, filed on Jul. 20, 2007.

(60) Provisional application No. 60/832,580, filed on Jul. 21, 2006.

(51) Int. Cl.
*B01J 23/42* (2006.01)

(52) U.S. Cl. .................. 502/339; 502/335; 60/295

(58) Field of Classification Search .......... 502/73, 502/300, 304, 325–339, 349, 355; 60/274, 60/285, 295, 299, 302
See application file for complete search history.

(56) References Cited

U.S. PATENT DOCUMENTS

| | | | |
|---|---|---|---|
| 3,565,830 A | 2/1971 | Keith et al. |
| 4,316,822 A | 2/1982 | Fujitani et al. |
| 4,329,162 A | 5/1982 | Pitcher, Jr. |
| 4,515,758 A | 5/1985 | Domesle et al. |
| 4,727,052 A | 2/1988 | Wan et al. |
| 4,740,360 A | 4/1988 | Geus et al. |
| 4,828,807 A | 5/1989 | Domesle et al. |
| 4,857,089 A | 8/1989 | Kitagawa et al. |
| 4,902,487 A | 2/1990 | Cooper et al. |
| 4,902,664 A | 2/1990 | Wan |
| 5,013,705 A | 5/1991 | Koberstein et al. |
| 5,063,192 A | 11/1991 | Murakami et al. |
| 5,098,455 A | 3/1992 | Doty et al. |
| 5,130,109 A | 7/1992 | Wan |
| 5,173,349 A | 12/1992 | Yavuz et al. |
| 5,194,154 A | 3/1993 | Moyer et al. |
| 5,198,007 A | 3/1993 | Moyer et al. |
| 5,254,519 A | 10/1993 | Wan et al. |
| 5,340,516 A | 8/1994 | Yavuz et al. |
| 5,491,120 A | 2/1996 | Voss et al. |
| 5,939,354 A | 8/1999 | Golden |
| 5,993,762 A | 11/1999 | Rajaram et al. |
| 6,255,249 B1 | 7/2001 | Voss et al. |
| 6,294,141 B1 | 9/2001 | Twigg et al. |
| 6,306,335 B1 | 10/2001 | Wallin et al. |

(Continued)

FOREIGN PATENT DOCUMENTS

EP   1142619   10/2001

(Continued)

*Primary Examiner*—Stuart Hendrickson
*Assistant Examiner*—Richard M Rump

(57) ABSTRACT

A catalyzed soot filter is comprised of a monolithic ceramic honeycomb body that has a catalyzed inlet zone that has a catalyst within the walls of the ceramic honeycomb inlet end to at most about 45% of the length of the catalyzed soot filter. The catalyzed inlet zone has a porosity that is at least ⅓ the porosity of a wall of the ceramic honeycomb that does not have a catalyst in the wall.

20 Claims, 4 Drawing Sheets

U.S. PATENT DOCUMENTS

| | | |
|---|---|---|
| 6,375,910 B1 * | 4/2002 | Deeba et al. ............ 423/239.1 |
| 6,582,796 B1 | 6/2003 | Joulin et al. |
| 6,596,665 B2 | 7/2003 | Wallin et al. |
| 6,669,751 B1 | 12/2003 | Ohno et al. |
| 6,753,294 B1 | 6/2004 | Brisley et al. |
| 7,189,375 B2 | 3/2007 | Moliniker et al. |
| 2001/0038810 A1 | 11/2001 | Wallin et al. |
| 2002/0044897 A1 | 4/2002 | Kakwani et al. |
| 2002/0197191 A1 | 12/2002 | Takeshima et al. |
| 2003/0124037 A1 | 7/2003 | Voss et al. |
| 2003/0138596 A1 | 7/2003 | Harada et al. |
| 2004/0020359 A1 | 2/2004 | Koermer |
| 2004/0161373 A1 * | 8/2004 | Ichikawa et al. ............ 422/180 |
| 2004/0175315 A1 * | 9/2004 | Brisley et al. ............ 423/239.1 |
| 2005/0113249 A1 | 5/2005 | Ziebarth et al. |
| 2006/0057046 A1 * | 3/2006 | Punke et al. ............ 423/215.5 |

FOREIGN PATENT DOCUMENTS

| | | |
|---|---|---|
| EP | 1496212 | 1/2005 |
| EP | 1657410 | 5/2006 |
| EP | 1839748 | 10/2007 |
| GB | 1119180 | 7/1968 |
| WO | 9700119 | 1/1997 |
| WO | 9912642 | 3/1999 |
| WO | 0062923 | 10/2000 |
| WO | 0102083 | 1/2001 |
| WO | 03011437 | 2/2003 |
| WO | 03051488 | 6/2003 |
| WO | 03082773 | 10/2003 |
| WO | 2004011124 | 2/2004 |
| WO | 2004011386 | 2/2004 |
| WO | 2004079167 | 9/2004 |
| WO | 2005021138 | 3/2005 |

* cited by examiner

ZONE CATALYZED SOOT FILTER

CROSS-REFERENCE TO RELATED APPLICATIONS

The present application claims the benefit of the filing date of U.S. application Ser. No. 11/880,381, filed Jul. 20, 2007, which is hereby incorporated by reference for all purposes. This application also claims the benefit of U.S. Provisional Application No. 60/832,580, filed Jul. 21, 2006.

FIELD OF THE INVENTION

The present invention relates to an improved catalyzed particulate filter. In particular the invention relates to catalyzed soot filters that have one or more zones of catalysts.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. The filters have had many configurations as exemplified by GB 1,014,498 and U.S. Pat. No. 4,828,807. The most common and useful filters have tended to be porous ceramic honeycombs that have plugged channels such that the exhaust gas must enter a channel and pass through the wall of the channel as exemplified by U.S. Pat. Nos. 4,329,162 and 4,857,089.

To more effectively catalyze the combustion of soot and mediate polluting combustion gases such as NOx, CO and unburnt hydrocarbons, catalysts have been used. Catalysts have been employed on filter elements in series where the gas passes through one filter with a catalyst thereon and then passes through another having a different catalyst such as described by GB 1,014,498 and U.S. Pat. No. 4,828,807. In addition, catalyst have been placed on a flow through substrate honeycomb (three way catalyst converter in one's car) separately in front of a filter such as in U.S. Pat. No. 4,902,487. In a variation, of this approach, a catalyst has been placed partially in the channels of a honeycomb filter on the inlet channels walls effectively creating a flow though catalyst on the front portion of the inlet channels as shown by U.S. Pat. Nos. 6,294,141 and 6,753,294. Each of these suffers from reducing the total effective filter area and excessive thermal stresses due to exaggerated different combustion along the length of the filter.

What is needed is a Diesel particulate filter that avoids one or more problems of the prior art such as one of the aforementioned problems. In particular, it would be desirable to provide a catalyzed Diesel particulate filter that maximizes the effective filtration area while smoothing out temperature differences within the catalyst due to combustion of differing species along the length of the filter.

SUMMARY OF THE INVENTION

We have discovered an improved catalyzed soot filter that maximizes the effective filtration area while still providing gaseous pollutant abatement. The filter is also able to mitigate temperature differences due to differing species being combusted preferentially along the filter, which surprisingly allows the catalyzed filter to have improved soot combustion and thermal shock resistance than catalyzed filters without zones or with zones where the first zone does not also filter and combust the soot.

A first aspect of this invention is a catalyzed soot filter comprising a porous monolithic ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body has an inlet end catalyzed zone comprising at least one filtering porous partition wall having a catalyst within the pores of the wall from the inlet end to at most about 45% of the length of the ceramic honeycomb wall-flow filter said inlet catalyzed zone having a porosity no less than about ⅓ of the porosity of a partition wall without catalyst.

Surprisingly, the catalyzed filter of the invention preferentially captures finer soot particles due to the reduced gas flow through the inlet catalyzed zone while still allowing gaseous pollutant abatement (e.g., HC combustion and CO conversion). The preferential collection of finer soot particles within the inlet end tends to allow for reduced temperature differences during regeneration of the filter (i.e., burnout of the soot), because the entire length of the filter tends to contain a more uniform distribution of soot. In addition, it is believed that the soot in the second zone tends to be comprised of solid particulate soot as opposed to liquid (soot containing hydrocarbon fractions).

The catalyzed soot filter may be used in any applications in which soot needs to be removed from a gaseous stream such as an automobile, train, truck or stationary power plant exhaust. The catalyzed soot filter is particularly useful to remove soot from Diesel engine exhausts.

DETAILED DESCRIPTION OF THE INVENTION

Figure 1:
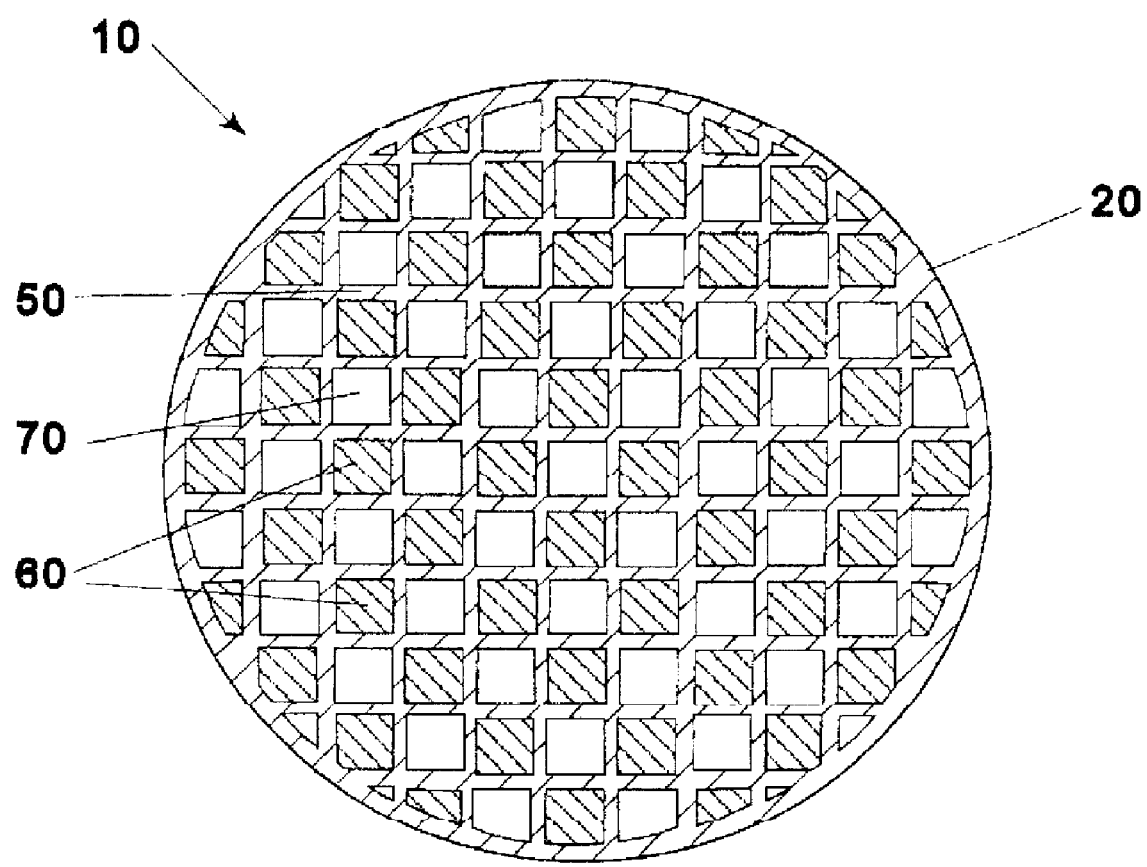
FIG. 1 is a view of the catalyzed soot filter looking down at the inlet end of the filter.
Figure 2:
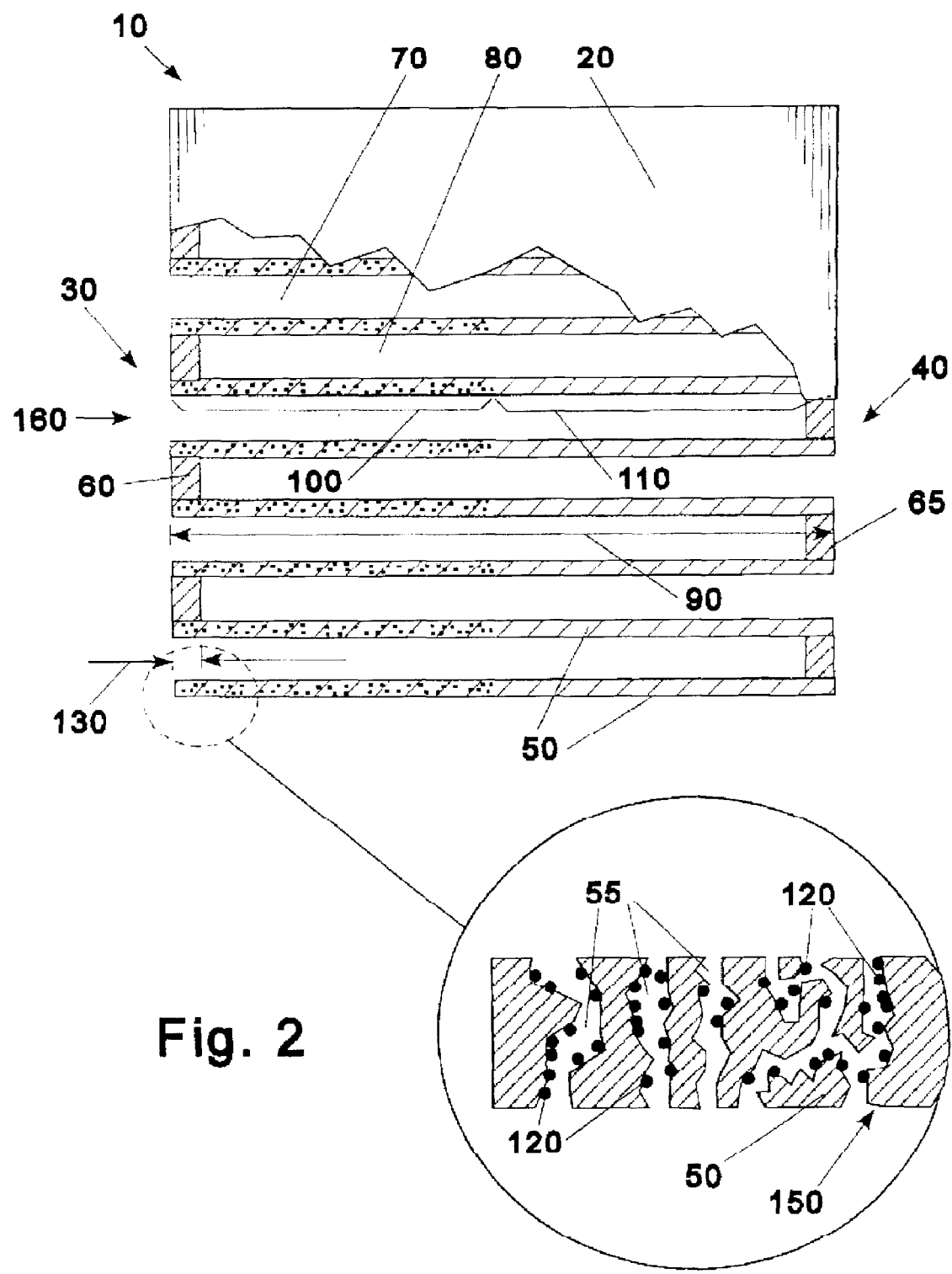
FIG. 2 is a cut away view of the length of an illustrative embodiment of the catalyzed soot filter and a blown up portion of the catalyzed inlet zone of the catalyzed soot filter.

Referring to the Figures as an illustration, the invention is a catalyzed soot filter 10. The catalyzed soot filter is comprised of a porous ceramic honeycomb 20 having an inlet end 30 and outlet end 40. The honeycomb 20 is comprised of interlaced porous partition walls 50 with inlet plugs 60 and outlet plugs 65, which define inlet channels 70 and outlet channels 80. Along the length 90 of the honeycomb 20 there is an inlet catalyzed zone 100 and an outlet zone 110. In the inlet catalyzed zone 100 there is catalyst 120 within the pores 55 of the partition wall 50 essentially from the inlet end 30 to at most about 45% of the length 90 of the honeycomb 20. Essentially from the inlet end 30 means that the catalyst 120 is within a plug length 130 from the inlet end 30.

Even though the length of the catalyzed inlet zone 100 may be up to 45% of the length 90 of the honeycomb 20, it is generally not necessary for the zone to be that long. The length of the catalyzed inlet zone 100 in rising preference is at most about 40%, 35%, 30%, 25%, 20%, 15%, and 10% to generally at least about 2% of the length 90 of the honeycomb 20.

The amount of catalyst 120 within partition wall 50 of the inlet catalyzed zone 100 is an amount that reduces the porosity of the partition wall 50 to a porosity no less than about 1/3 the porosity of the partition wall 50 without catalyst. For example if the porosity of the partition wall 50 is 75% porous, the partition wall 50 with catalyst would be no less than 25% porous. The porosity of the partition wall 50 within the inlet catalyzed zone 100 in rising preference, is no less than about 2/3, no less than about 1/2, no less than about 3/5, no less than about 3/4, no less than 7/8 and no less than 15/16 of the porosity of the partition wall 50 without catalyst. Of course since there is a catalyst present in the pores 55 of the partition wall 50 of the inlet catalyst zone 100, the porosity is less than a partition wall 50 without catalyst and generally the amount of porosity on the partition wall 50 of the inlet catalyzed zone is no more than 31/32 of the porosity of partition wall 50 without a catalyst.

The catalyst 120 within partition wall 50 of the inlet catalyze zone 100 means that the catalyst 120 does not substantially bridge the pores 55 within or at the surface 150 of the partition wall 50. "Does not substantially bridge the pores 55" means that the pressure drop due to gas 160 flowing through the partition wall 50 of the inlet catalyzed zone 100 is no more than about 10 times greater than the pressure drop of partition wall 50 without catalyst. In rising preference, the pressure drop across partition wall 50 in the inlet catalyzed zone 100 is no more than about 9 times, 8 times, 7 times, 6 times 5 times, 4 times 3 times, 2 times, 1.8 times, 1.6 times, 1.5 times, 1.4 times 1.3 times 1.2 times greater than the pressure drop across partition wall 50 without catalyst, but generally is at least about 1.1 times greater than partition wall 50 without catalyst. The pressure drop is measured at typical operating conditions of diesel engines using any suitable technique such as those known in the art. For example, a gas flow rate of about 30 thousand to 70 thousand space velocity (1/hour) may be used. The space velocity is the total amount of gas flowing in 1 hour through a DPF having a given geometric volume.

Figure 3:
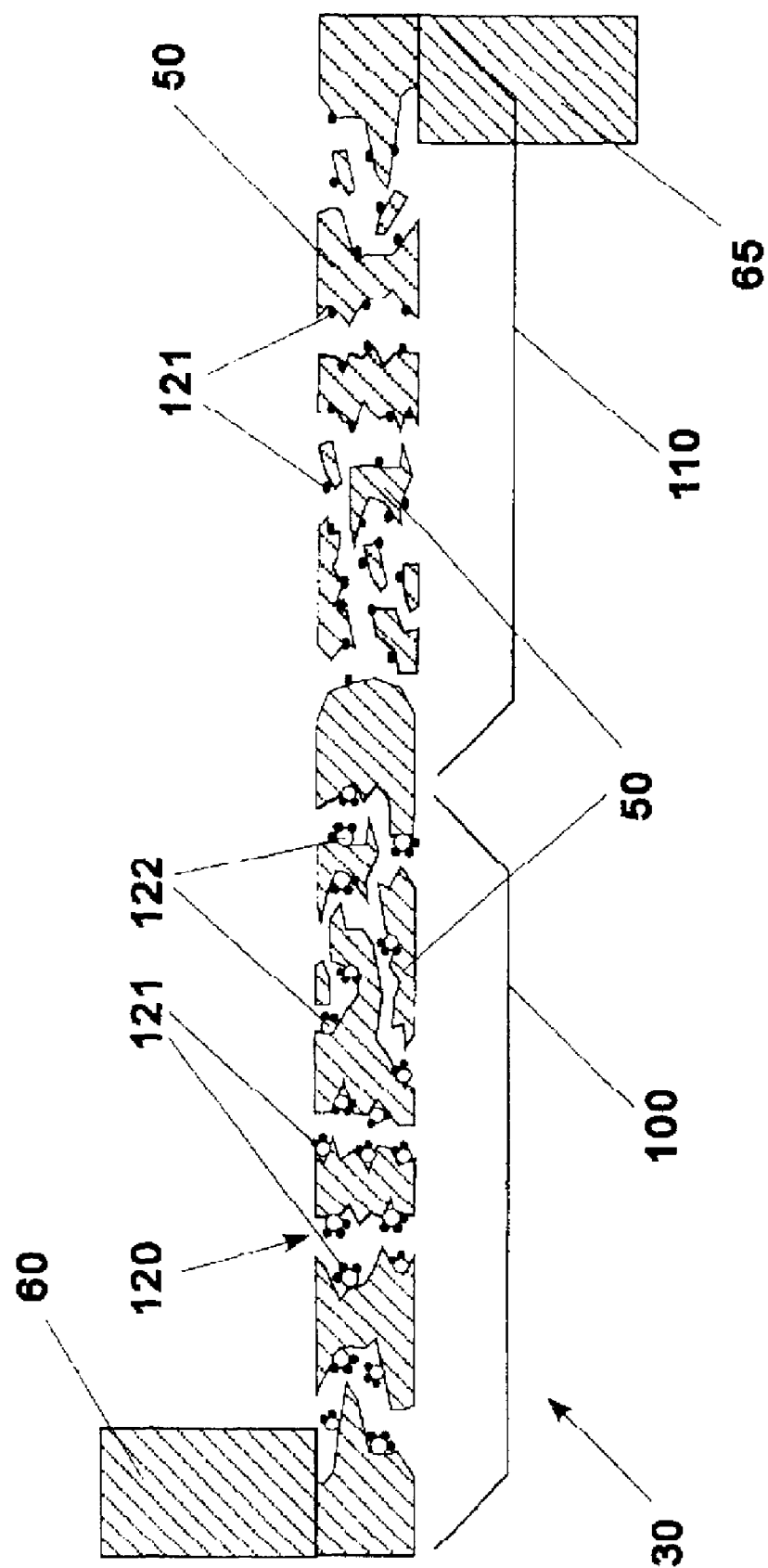
FIG. 3 is a blow up of a length of a channel's partition wall of an embodiment of the invention.

The inlet catalyzed zone 100 is followed by outlet zone 110. The outlet zone 110 may be comprised of one zone or multiple sub-zones with each zone or sub-zone having the same make-up so long as the outlet zone itself or a sub-zone of the outlet zone 110 has a porosity greater and/or a lower pressure drop than in the inlet zone 100 with similar relative ratios of porosity and pressure drops as described above for partition walls 50 without catalyst. Illustratively, referring to a preferred embodiment depicted in FIG. 3, the catalyzed inlet zone 100 is comprised of a catalyst 120 that is composed of a metal catalyst 121 on an oxide washcoat 122 and the outlet zone 110 within its partition wall 50 has the same metal catalyst 121 at the same concentration per volume of the partition 50 of the inlet catalyzed zone, but without the washcoat 122 in the partition wall 50 of the inlet catalyzed zone 100.

Figure 4:
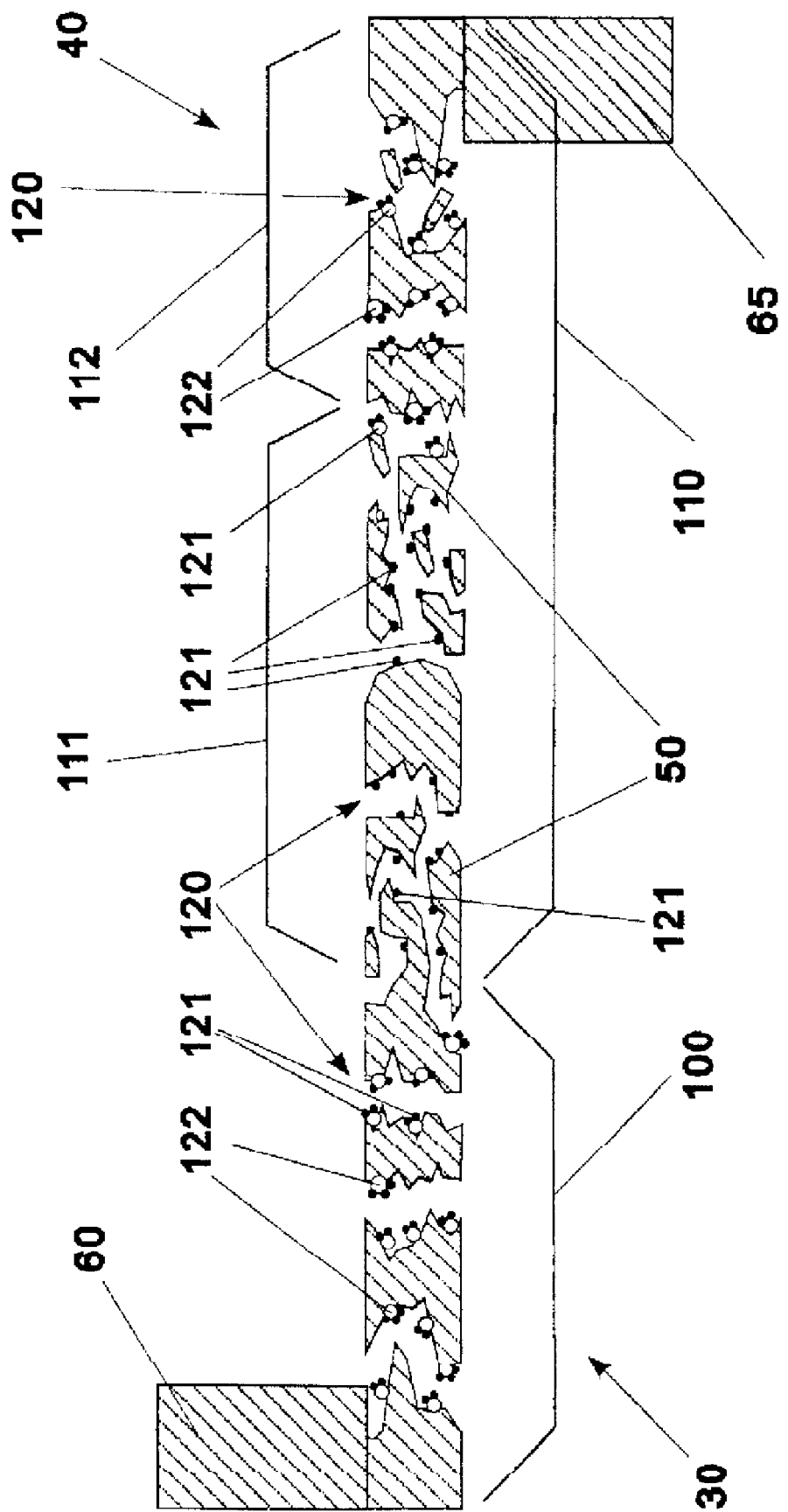
FIG. 4 is a blow up of a length of a channel's partition wall of another embodiment of the invention

In another preferred embodiment, depicted in FIG. 4, the inlet catalyzed zone 100 is the same as described in the previous paragraph, but the outlet zone 110 is comprised of a first outlet sub-zone 111 having either no catalyst in its partition wall 50 or just a metal catalyst 121 as described above and a second outlet sub-zone 112 having catalyst 120, that is different than the catalyst 120, if present, in the first outlet sub-zone 111, but may be the same as the catalyst 120 in the inlet catalyzed zone 100, but is preferably different from the catalyst 120 in the inlet catalyzed zone 100. "Different" means having a differing composition and/or concentration (loading) within the partition wall 50. In the case of the second outlet sub-zone 112, a sub-zone removed from the catalyzed inlet zone, the catalyst may cover the surface 150 of the partition wall and effectively block the flow of gas through its partition wall 50. However if such an un-preferred second sub-zone 112 (catalyst completely covering the surface or filling in the pores 55 of its partition wall) is present, it has a very short length, for example, of no greater than about 10% and preferably no greater than about 5% of the length of the honeycomb 20. Exemplary catalysts for the outlet zone 110 maybe any suitable such as those described herein.

The porous ceramic honeycomb 20 as well as the plugs 60 and 65 (note, the plugs may be the same or a different ceramic than the honeycomb as well as may simply be the partition walls 50 of the honeycomb 20 pinched together to close off a channel 70-80) may be any suitable ceramic or combinations of ceramics such as those known in the art for filtering Diesel soot. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. Nos. 6,582,796 and 6,669,751B1 and WO Publications EP1142619A1, WO 2002/070106A1. Other suitable porous bodies are described by WO 2004/011386A1, WO 2004/011124A1, US 2004/0020359A1 and WO 2003/051488A1.

The mullite is preferably a mullite having an acicular microstructure. Examples of such acicular ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT Publication WO 03/082773.

The porous ceramic honeycomb 20, generally, has a porosity of about 30% to 85%. Preferably, the porous ceramic honeycomb 20 has a porosity of at least about 40%, more preferably at least about 45%, even more preferably at least about 50%, and most preferably at least about 55% to preferably at most about 80%, more preferably at most about 75%, and most preferably at most about 70%.

The honeycomb 20 as well as the channels 70 and 80 may be any geometric cross-sectional configuration such as round, oval, square, rectangle or any other geometric shape depending on the application. The honeycomb 20 may be any size and is dependent upon the application.

The catalyst 120 of the catalyzed inlet zone 100, may be any catalyst useful to catalyze the combustion of soot, carbon monoxide and/or hydrocarbons. The catalyst 120 of the catalyzed inlet zone 100 preferably also abates one or more other pollutant gases in a Diesel exhaust stream such as NOx (e.g., selective catalyst reduction "SCR" to nitrogen and CO oxidized to form $CO_2$). In a preferred embodiment, the catalyst 120 of the catalyzed inlet zone 100, catalyzes soot, CO and hydrocarbon combustion, and also may convert NOx to $NO_2$.

It typically is desirable for the catalyst 120 of the catalyzed inlet zone 100, to be comprised of an oxide washcoat 122 and a metal catalyst 121 on the washcoat 122. A preferred washcoat is an oxide of aluminum, cerium, zirconium, aluminosilicate (e.g., zeolite) or combination thereof. More preferably the washcoat 122 is an oxide of cerium, zirconium or combination thereof. Other exemplary washcoats that may be useful are those that are described in U.S. Pat. Appl. 2005/0113249 and U.S. Pat. Nos. 4,316,822; 5,993,762; 5,491,120 and 6,255,249.

When using a washcoat 122, typical washcoats that are formed using ballmilling oxide particles may be used, but are not preferred because they tend to clog the pores of the partition wall 50 of the honeycomb 20 due to the average particle size typically being greater than 1 micrometer to about 20 micrometers. Examples of such washcoats are described by U.S. Pat. Nos. 3,565,830; 4,727,052 and 4,902,664. Preferably, the washcoat 122, when used, is precipitated from a solution as described by U.S. Pat. Appl. 2005/0113249, paragraphs 19-24, incorporated herein by reference. These typical (ballmilled) washcoats, generally, are preferably used in the outlet zone 110.

In another preferred embodiment, the washcoat 122 particulates are colloidal particles dispersed within a liquid. Colloid herein means a particulate having an average particle size of less than 1 micrometer by number. The colloid may be crystalline or amorphous. Preferably, the colloid is amorphous. The colloid is preferably an alumina, ceria, zirconia or combination thereof. Such colloids are available under the trade name NYACOL, Nyacol Nano Technologies Inc., Ashland, Mass.

The colloid preferably has a small particle size where all of the particles are less than 750 nanometers (nm) in equivalent spherical diameter by number. Preferably the average particle size is less than about 500 nanometers (nm), more preferably less than about 250 nm, even more preferably less than about 100 nm, and most preferably less than about 50 nm to preferably at least about 1 nm, more preferably at least about 5 nm, and most preferably at least about 10 nm in diameter by number.

The amount of catalyst 120 in the partition wall 50 of the catalyzed inlet zone is as described, above, but for illustration purposes, the total amount of catalyst 120 may be present in an amount of 50 to 6000 grams per cu-ft and is dependent, for example, on the application and particular honeycomb 20 used. The volume, as is convention, is taken as the geometric volume of the honeycomb 20, which in this case is taken as the cross-sectional area of the honeycomb 20 by the length of the catalyzed inlet zone 100.

Other examples of catalysts useful for combusting soot and hydrocarbons are described in col. 4, lines 25-59 of U.S. Pat. No. 4,828,807, incorporated herein by reference. Any of the catalysts described may be combined with a noble metal to improve the conversion of the gaseous pollutants traversing through the partition wall 50 of the catalyzed inlet zone 100.

The noble metal (e.g., platinum, rhodium, palladium, rhenium, ruthenium gold, silver or alloys thereof), when used in the partition wall 50 of the catalyzed inlet zone 100, is preferably comprised of Pt, Pd, Rh, or combination thereof. Preferably, for the catalyzed inlet zone 100, the noble metal is comprised of Pt and more preferably, the noble metal is Pt. The amount of Pt in the catalyzed inlet zone 100, may vary over a large range depending, for example, on the application. Generally, the amount of noble metal is about 1 g/cu-ft to about 500 g/cu-ft. Preferably the amount of noble metal is at least about 1, more preferably at least about 5 and most preferably at least about 10, to preferably at most about 250, more preferably at most about 125, and most preferably at most about 50 g/cu-ft.

Other exemplary catalysts include directly bound-metal catalysts, such as noble metals, alkaline metal, alkali metal base metals and combinations thereof. Examples of noble metal catalysts include platinum, rhodium, palladium, ruthenium, rhenium, gold, silver and alloys thereof. Examples of base, alkali, alkaline metal catalysts include copper, chromium, iron, cobalt, nickel, zinc, manganese, vanadium, titanium, scandium, sodium, lithium, calcium, potassium, cesium and combinations thereof. The metal catalyst, preferably, is in the form of a metal, but may be present as an inorganic compound or glass, such as a silicate, oxide, nitride and carbide, or as a defect structure within the ceramic grains of the porous ceramic. The metal may be applied by any suitable technique, such as those known in the art. For example, the metal catalyst may be applied by chemical vapor deposition.

A second exemplary catalyst is one that is incorporated into the lattice structure of the ceramic grains of the porous ceramic. For example, an element may be Ce, Zr, La, Mg, Ca, a metal element described in the previous paragraph or combinations thereof. These elements may be incorporated in any suitable manner, such as those known in the art.

A third exemplary catalyst is a perovskite-type catalyst comprising a metal oxide composition, such as those described by Golden in U.S. Pat. No. 5,939,354. Other exemplary catalysts include those describe at col. 4, lines 20-59 in U.S. Pat. No. 4,828,807, incorporated herein by reference.

Other Exemplary methods for depositing one or more of the catalyst components are described in U.S. Pat. Nos. 4,515,758; 4,740,360; 5,013,705; 5,063,192; 5,130,109; 5,254,519; 5,993,762 and; U.S. Patent Application Publications 2002/0044897; 2002/0197191 and 2003/0124037; International Patent Publication WO97/00119; WO 99/12642; WO 00/62923; WO 01/02083 and WO 03/011437; and Great Britain Patent No. 1,119,180.

After contacting the porous ceramic, for example, with the colloid, the porous body is typically dried by any suitable method such as letting the liquid medium dry at ambient temperatures or lightly heating (e.g., up to 400° C. or so) in any suitable gas such as dry air, nitrogen or any other gas useful to dry the solution or slurry. After, drying, typically the catalyst is further heated, for example, to adhere and/or realize the catalyst chemistry desired (e.g., decompose a carbonate to an oxide) to form the catalyst within the walls. Generally, the heating temperature is at least about 400° C. to about 1600° C. Typically, the temperature is at least about 500° C. to about 1000° C. The heating may be any suitable atmosphere such as those known in the art for any given catalyst.

The zones may be created by any suitable method, such as those known in the art such as dipping only one end of the honeycomb into a slurry or solution of the catalyst to be deposited. Combinations of dipping in a differing catalyst solutions or slurries at one or both ends, or immersion of the entire honeycomb in a catalyst solution or slurry followed by dipping another catalyst solution/slurry at one or both ends or any number of combinations thereof may be used to create the catalyzed filter. Removable coatings that act as barriers to the catalyst coatings may also be employed such as waxes.

What is claimed is:

1. A catalyzed soot filter comprising a porous monolithic ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body has an inlet catalyzed zone comprising at least one filtering porous partition wall having a catalyst consisting within the pores of the wall from the inlet end to at most about 45% of the length of the ceramic honeycomb wall-flow filter said inlet catalyzed zone having a porosity no less than about $1/3$ and no more than $31/32$ of the porosity of said filtering partition wall without catalyst and wherein the catalyzed soot filter has an outlet zone extending from the outlet end to the inlet catalyzed zone, said outlet zone having a pressure drop across the partition wall of the outlet zone that is lower than the pressure drop across the partition wall of the inlet catalyzed zone.

2. The catalyzed soot filter of claim 1, wherein the inlet catalyzed zone has a porosity that is at least 40% porous.

3. The catalyzed soot filter of claim 1, wherein the partition wall of the inlet catalyzed zone has a pressure drop of no more than about 9 to at least 1.1 times that of the partition wall of the outlet zone.

4. The catalyzed soot filter of claim 1, wherein the pressure drop is no more than about 5 times that of a partition wall of the outlet zone.

5. The catalyzed soot filter of claim 3, wherein the pressure drop is no more than about 2 times that of a partition wall of the outlet zone.

6. The catalyzed soot filter of claim 3, wherein the pressure drop is no more than about 1.5 times that of a partition wall of the outlet zone.

7. The catalyzed soot filter of claim 1, wherein the catalyzed soot filter has a noble metal catalyst along the entire length of the catalyzed soot filter.

8. The catalyzed soot filter of claim 7, wherein the noble metal is selected from the Pt, Pd, Rh, or combination thereof.

9. The catalyzed soot filter of claim 7, wherein the catalyst of the inlet catalyzed zone is comprised of an oxide washcoat and a noble metal thereon.

10. The catalyzed soot filter of claim 9, wherein the oxide washcoat is comprised of cerium oxide.

11. The catalyzed soot filter of claim 10, wherein the oxide washcoat is further comprised of zirconium oxide.

12. The catalyzed soot filter of claim 1, wherein the catalyst of the inlet catalyzed zone is comprised of colloidal washcoat particles.

13. The catalyzed soot filter of claim 12, wherein the outlet zone has a catalyst that is comprised of a noble metal directly upon the partition wall of the outlet catalyzed zone.

14. The catalyzed soot filter of claim 12, wherein the outlet zone is comprised of at least two subzones, a first subzone extending from the outlet end to at most 10% of the length of the catalyzed soot filter and a second subzone extending from the first subzone to the catalyzed inlet zone, the first subzone having a catalyst comprising an oxide washcoat and a noble metal on the oxide washcoat within the partition wall of said first subzone.

15. The catalyzed soot filter of claim 14, wherein the oxide washcoat is aluminum oxide, cerium oxide, cerium-zirconium oxide or combination thereof, and the noble metal is comprised of Pd.

16. The catalyzed soot filter of claim 15, wherein the noble metal is Pd in combination with Pt.

17. The catalyzed soot filter of claim 14, wherein the second subzone has no catalyst within the partition wall of the second subzone.

18. The catalyzed soot filter of claim 14, wherein the partition wall of the second subzone has a catalyst that is a noble metal within and directly on the partition wall of the second subzone.

19. The catalyzed soot filter of claim 18, wherein the catalyst of the inlet catalyzed zone is comprised of the same noble metal in the second subzone.

20. The catalyzed soot filter of claim 1, wherein the ceramic honeycomb is mullite.

* * * * *